United States Patent
Revill

(10) Patent No.: US 12,150,454 B2
(45) Date of Patent: Nov. 26, 2024

(54) NET FOR MEAT PRODUCT

(71) Applicant: TruNature Limited, Ashby-de-la-Zouch (GB)

(72) Inventor: Stuart Revill, Asby-de-la-Zouch (GB)

(*) Notice: Subject to any disclaimer, the term of this patent is extended or adjusted under 35 U.S.C. 154(b) by 618 days.

(21) Appl. No.: 17/438,578

(22) PCT Filed: Mar. 11, 2020

(86) PCT No.: PCT/GB2020/050604
§ 371 (c)(1),
(2) Date: Sep. 13, 2021

(87) PCT Pub. No.: WO2020/183170
PCT Pub. Date: Sep. 17, 2020

(65) Prior Publication Data
US 2022/0125062 A1    Apr. 28, 2022

(30) Foreign Application Priority Data

Mar. 11, 2019 (GB) ..................................... 1903319
Mar. 12, 2019 (GB) ..................................... 1903384
May 3, 2019 (GB) ..................................... 1906307
May 4, 2019 (GB) ..................................... 1906333

(51) Int. Cl.
*A22C 17/00* (2006.01)
*A22C 13/00* (2006.01)

(52) U.S. Cl.
CPC .......... *A22C 17/0093* (2013.01); *A22C 13/00* (2013.01); *A22C 2013/0056* (2013.01); *A22C 2013/0086* (2013.01)

(58) Field of Classification Search
CPC .............. A22C 17/0093; A22C 13/00; A22C 2013/0056; A22C 2013/0086
See application file for complete search history.

(56) References Cited

U.S. PATENT DOCUMENTS

| | | | |
|---|---|---|---|
| 4,410,011 A | 10/1983 | Andra et al. | |
| 7,247,359 B1* | 7/2007 | Mercuri | A22C 13/00 |
| | | | 428/36.1 |
| 2010/0021663 A1* | 1/2010 | Thiele | A22C 13/0013 |
| | | | 428/34.8 |
| 2020/0037622 A1* | 2/2020 | Raue | A22C 13/0013 |

FOREIGN PATENT DOCUMENTS

| | | | |
|---|---|---|---|
| CA | 843 085 | 6/1970 | |
| DE | 12 22 398 | 8/1966 | |
| EP | 2478772 A1 * | 7/2012 | ......... A22C 13/0013 |
| FR | 2 563 813 | 11/1985 | |
| WO | WO-2008049649 A1 * | 5/2008 | ............. A22C 13/00 |

OTHER PUBLICATIONS

English translation to WO-2008049649-A1 to Nagel et al. obtained from PE2E database (Year: 2008).*
International Searching Authority: International Search Report and Written Opinion, App. No. PCT/GB2020/050604 (May 26, 2020).
International Preliminary Examining Authority: Written Opinion, App. No. PCT/GB2020/050604 (Feb. 16, 2021).
International Preliminary Examining Authority: International Preliminary Report on Patentability, App. No. PCT/GB2020/05064 (Jun. 16, 2021).

* cited by examiner

*Primary Examiner* — Jeremy R Pierce
(74) *Attorney, Agent, or Firm* — Walters & Wasylyna LLC

(57) ABSTRACT

A shrinkable food preparation product used for cooking layered or rolled meat products such as cooked ham has improved characteristic for squeezing the meat.

18 Claims, 3 Drawing Sheets

NET FOR MEAT PRODUCT

This application is the U.S. national phase entry of Intl. App. No. PCT/GB2020/050604 filed on Mar. 11, 2020, which claims priority from GB1903319.0 filed on Mar. 11, 2019, GB1903384.4 filed on Mar. 12, 2019, GB1906307.2 filed on May 3, 2019, and GB1906333.8 filed on May 4, 2019. The entire contents of Intl. App. No. PCT/GB2020/050604, GB1903319.0, GB1903384.4, GB1906307.2, and GB1906333.8 are incorporated herein by reference.

FIELD OF THE INVENTION

This invention relates to a shrinkable food preparation product for the preparation, dressing, encapsulation and/or packaging of food products, in particular, raw and processed food products such as boned and rolled meat joints, whole poultry and other processed sausage-style meats. More particularly, but not exclusively, the invention relates to a tubular net, thread, knotted loop, or butcher's-type string (also referred to as "twine"), suitable for tying, netting, encapsulating, dressing or otherwise useful in the preparation of a meat, poultry or other raw-food product, which shrinks when heated thus compressing the food product during the cooking process. More particularly, but not exclusively, the invention relates to an elastic or non-elastic tubular, knitted net, comprising a weft thread and/or a warp thread that shrinks when heated.

BACKGROUND OF THE INVENTION

Tubular elasticated netting is used to encapsulate meat products such as joints of beef or pork. The net remains on the joint during cooking to retain the shape and integrity of the joint. An example of a knitting machine which produces such netting is to be found in British Patent No. 2333301. An example of a machine which packages meat in such netting is to be found in our British Patent No. 2380179. Reference is made to the specifications of these patents for a clearer understanding of the present invention.

In addition to its use on joints of meat elasticated netting is also used in the preparation and presentation of cooked meat products such as sausages, hams, salamis and frankfurters. Portions of these products are encased in plastics, or sometimes fibrous, enclosures which limit their expansion during cooking and result in the uniform, cylindrical cooked meat products which supermarkets require for presentation and sales purposes, and which facilitate slicing. Emulsions are commonly contained in collagen film. However, it is necessary for the meat to be squeezed during cooking to prevent distortions due to the formation of voids as fats are melted. To achieve this, it is known to enclose the imperforate casing in a tubular, elasticated net. However, unless the stretch of the elastic is limited the result is unlikely to be the desired, uniform cylinder.

U.S. Pat. No. 1,679,822 discloses a short-stretch covered elastic thread comprised of a rubber thread covered with helically wound textile threads. The latter are said to limit the stretch of the rubber as they straighten, i.e. as the pitch of the spiral windings increases. European Patent No. 1154696 discloses the use of such a covered thread as the weft of a net used to encapsulate food products. The yarn windings on the rubber thread limit the stretch of the rubber.

Food-grade nets of the kind described in European Patent No. 1154696 have been used commercially; however, problems arise from the use of such nets to control the shape of cooked meat products. Such problems, include that, as acknowledged in U.S. Pat. No. 1,679,822, if inextensible and rubber threads are simply laid side-by-side and covered by yarn windings the resulting thread is so deformed as to be unmanageable and unsightly except when under extreme tension. If a fine cotton or nylon thread is wound helically around the rubber thread it is easily broken when tensioned. The use of a thicker, stronger inextensible thread is not only expensive but greatly diminishes the stretchability of the rubber. In any event the limit of stretch of such an assembly is not precisely determinable. The extent to which the yarn will bite into the rubber as the latter is stretched will vary as will the ultimate pitch angle of the helically wound yarn.

In its previous patent, EP 2519667, entitled Tubular Elasticated Net with Inextensible Weft, the applicant disclosed a new and beneficial tubular net for encapsulating a meat product. The net comprises spaced apart warp threads and spaced apart pairings of elastic and substantially inextensible weft threads. Reference is made to the specification of patent EP '667 for a clearer understanding of the present invention. The product patented in EP '667 and marketed under the brand name Total Control Net® has been very successful commercially, in countries throughout the world.

It will be seen in EP '667, that all of the weft threads are connected to each of the warp threads and that the elastic and the substantially inextensible weft threads have no connection to one another between the warp threads, the arrangement being such that when the elastic weft threads are in a relaxed condition the substantially inextensible weft threads are in a slack, unstraightened condition and such that straightening and tensioning of the substantially inextensible weft threads, as the elastic weft threads are stretched, positively limits the diametral expansion of the net.

The use, in Total Control Net®, of an inextensible thread independent of the elastic thread, enables the use of an inextensible thread of whatever strength is desired without either impeding the stretchability of the elastic thread or unacceptably raising the cost of production of the net. The inextensible thread, which may simply be string; and the elastic thread, which might be of bare rubber (although typically is a rubber or synthetic rubber core on which a cotton, polyester or nylon yarn cover is helically wound); are drawn from separate bobbins and knitted to, or laid into the stitches of, the warp threads as the tubular net is produced in the conventional way. Having a definite limit to the diametral expansion of the net enables the accurate production of tubular nets suited to stuffing machines with nozzles of different sizes. By providing a net with a pre-fixed maximum diameter, fibrous casings and plastic shrink casings typically utilised in the manufacture of sliced meat products can be dispensed with, and/or an overall better quality, more uniform product can be made in conjunction with plastics or to add compression to fibrous casings. The provision of a pre-set calibre stable netting eliminates, or at least reduces variation in product size and gives manufacturers control over and certainty about the maximum diameter of their end-product, before the meat has been netted.

The applicant, being continually innovative has developed yet a further improvement in the field a tubular net, thread, knotted loops, twine and/or butcher's-type string, suitable for tying, netting, encapsulating, dressing or otherwise useful in the preparation of a meat, poultry or other raw-food product.

SUMMARY OF THE INVENTION

According to a first aspect of the invention for which protection is sought, there is provided a shrinkable food preparation product comprising a knitted food encapsulating structure formed from a heat-shrinkable thread comprising one or more yarns of a heat-shrinkable material, the heat-shrinkable material comprising or formed entirely from a High-Shrinkage Polyester that shrinks when heated in the temperature range 75° C. to about 225° C., whereby the knitted food encapsulating structure shrinks in the presence of sufficient heat, the knitted food encapsulating structure thereby being configured such that upon heating the food preparation product, permanent shrinking of at least some of said heat-shrinkable threads imparts a compressive force onto a food product prepared using the food preparation product.

Optionally, said High-Shrinkage Polyester is a polyethylene terephthalate-based yarn having a boiling water shrinkage of at least 40%.

Optionally, the shrinkable food preparation product comprises a tubular net suitable for encapsulating a meat product, the tubular net comprising spaced apart warp threads and spaced apart weft threads, said weft threads being connected to the warp threads, wherein the weft threads and/or warp threads at least in part comprise a yarn or material that shrinks in the presence of sufficient heat, the arrangement being such that upon heating the net, shrinking of the warp and/or weft threads imparts a compressive force on a product encapsulated by the tubular net. Alternatively, only said warp threads comprise a yarn or material that shrinks in the presence of sufficient heat, the arrangement being such that when the net is sufficiently heated, permanent shrinking of said warp threads imparts a compressive force in a vertical direction on a product encapsulated by the tubular net.

Optionally, said weft threads comprise a yarn or material that shrinks in the presence of sufficient heat, the arrangement being such that when the net is sufficiently heated, permanent shrinking of said weft threads imparts a compressive force in both horizontal direction on a product encapsulated by the tubular net.

The shrinking of a plurality of warp and/or weft threads along the tubular knitted food encapsulating structure may impart an axially inward compressive force in a tubular net.

Optionally, the weft threads and the warp threads comprise a yarn or material that shrinks in the presence of sufficient heat, the arrangement being such that when the net is sufficiently heated, permanent shrinking of the warp and weft threads imparts a compressive force in both horizontal and vertical directions on a product encapsulated by the tubular net. Optionally, said yarn or material is formed from High Shrinkage Polyester.

Optionally, the weft threads comprise spaced apart pairings of first elastic weft threads and second shrinkable weft threads; all of said first and second weft threads being connected to each of the warp threads, and wherein the first elastic and second shrinkable weft threads have no connection to one another between the warp threads, the arrangement being such that before heating the weft threads and warp threads, the net is stretchable, and such that upon heating the net, permanent shrinking of the second shrinkable weft threads imparts a compressive force on a product encapsulated by the tubular net.

Optionally, the first elastic and second shrinkable weft threads of each pair are connected at the same points along their lengths to the warp threads, these being the only connections between the elastic and shrinkable weft threads.

Optionally, the first and second weft threads are knitted to the warp threads.

Optionally, the first elastic weft threads are of bare rubber, or wherein each of the first elastic weft threads has a rubber or synthetic rubber core covered by helically wound yarn.

Optionally, the second shrinkable weft threads are a bare yarn.

Alternatively, the second shrinkable weft threads have a core formed from a yarn or material that shrinks in the presence of sufficient heat, covered by helically wound yarn. Optionally, the shrinkable weft threads are High-Shrinkage Polyester.

Optionally, the warp threads also at least in part comprise a yarn or material that shrinks in the presence of sufficient heat.

Optionally, the warp threads are a bare yarn.

Alternatively, the warp threads are formed from a yarn or material that shrinks in the presence of sufficient heat covered by a helically wound yarn. The shrinkable weft threads and shrinkable warp threads are preferably formed from High Shrinkage Polyester.

Optionally, said weft threads and/or said warp threads comprise a yarn or material that shrinks in the presence of sufficient heat that is are wrapped, wound, helically wound, braided and/or knitted.

Optionally, the tubular net is a knitted net. The knitted net may have square-shaped chains, hexagonal-shaped chains and/or diamond-shaped chains.

The net may be warp knitted and elasticated. Alternatively, the net may be warp knitted and not elasticated.

The net may be weft knitted and elasticated. Alternatively, the net may be weft knitted and not elasticated.

In some arrangements the net is closed at one end in the form of a stocking. In other arrangements, the net is open at both ends.

According to a further aspect of the invention for which protection is sought, there is provided a heat-shrinkable food preparation product comprising a heat-shrinkable thread comprising one or more fibres of a heat-shrinkable material.

According to a further aspect of the invention for which protection is sought, there is provided a method of preparing and cooking a meat product characterised in that the method comprises:
  (i) placing the meat product into a shrinkable food preparation product according to any of the relevant preceding paragraphs; and
  (ii) heating the netted product and shrinking the heat-shrinkable threads, thus imparting additional compressive force on the meat product encapsulated by a shrinkable food preparation product during the cooking process.

According to a further aspect of the invention for which protection is sought, there is provided a prepared meat product comprising a meat product disposed within a shrinkable food preparation product according to any of the relevant preceding paragraphs.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments will now be described, by way of example only, with reference to the accompanying drawings, in which.

DETAILED DESCRIPTION OF EMBODIMENTS

Detailed descriptions of specific embodiments of the heat-shrink and knitted net, and heat-shrink and knittable thread of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the heat-shrink and knitted nets, and heat-shrink knittable threads of the present invention described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
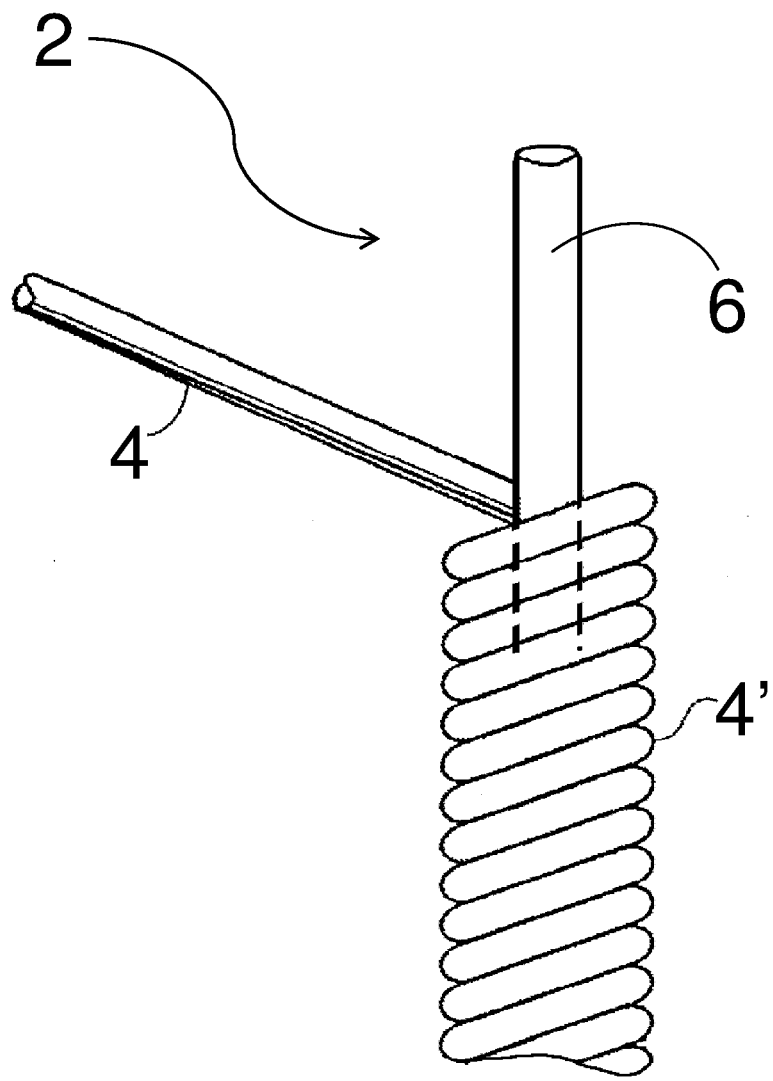
FIG. 1 is a schematic illustration of a heat-shrink and knittable thread according to embodiments of the present disclosure.

Referring now to FIG. 1, there is shown heat-shrink thread 2 being formed. The heat-shrink thread 2 comprises one or more strands 6 of a first heat-shrink material, such as but not limited to High Shrinkage Polyester that is covered by one or more strands 4 of a yarn that may or may not be a heat-shrink yarn. The thread 2 is sufficiently flexible, yet sufficiently strong that it is knittable, or suitable for incorporation into a knitted structure for use in encapsulating a food-product. The core strand 6 shown in FIG. 1 is formed from a first material that is a non-elastic material. To provide an optional degree of elasticity, the first material may be an elastic material. The first material is preferably however, a heat-shrink yarn or material.

The one or more strands 6 of first material may be covered by the one or more strands 4 of heat-shrink or non-heat-shrink yarn in a variety of suitable manners using a variety of suitable methods and techniques. For example, and as shown, the covering yarn 4 may be helically wound about the single strand 6 of first material. As illustrated in FIG. 1, the wound heat-shrink yarn 4' is wrapped in such a manner as to completely cover the internally disposed strands 6 of first material. In this way, notwithstanding the inherent material properties and characteristics of the first material 6, for example its ability to heat-shrink, the core of first material is bound within and covered by an outer layer 4' of non-heat-shrinkable yarn 4.

In other arrangements of the invention, the first material 6 is covered, sheathed, coated or otherwise protected by the yarn 4 by other methods and processes, for example by: wrapping, helical wrapping, braiding and/or knitting the heat-shrinkable yarn about said first material in one or more layers 4'.

Where two or more layers 4' of yarn 4 are disposed about the one or more strands 6 of first material, the two or more layers may be of different materials to one another; may each be formed from the same material; may be formed by the same method of covering; or may be formed by different methods of covering. For example, a first layer 4' may be helically wrapped, for example in a clockwise direction, and then another layer (see FIG. 2) may be applied over the top of said first layer 4', by any other suitable method, for example by helically wrapping yarn in the opposite, counter-clockwise direction.

The resulting heat-shrinkable yarn 2 may comprise High Shrinkage Polyester, such as that described in U.S. Pat. No. 4,826,949 to BASF Corporation. Other heat-shrinkable, food-grade, (preferably) knittable materials or filaments may be suitable for use in forming the heat-shrinkable thread 2 of the present invention.

The thread 2 shown in FIG. 1 comprises a single layer of helically wound polyester yarn 4', wound on top of a single strand of High Shrinkage Polyester. High Shrinkage Polyester yarn is a polyethylene terephthalate-based yarn that may be characterised by a boiling water shrinkage of at least 40%, that as well as being heat-shrinkable, is also sufficiently strong and flexible that it can be knitted, twisted and optionally knotted. The applicant has designed a thread 2 by wrapping, in a suitable manner, a strand of heat-shrink High Shrinkage Polyester yarn. The resultant thread 2, according to the present disclosure, may be knittable or at least suitable for incorporation into a knitted structure; and heat-shrinkable.

Figure 2:
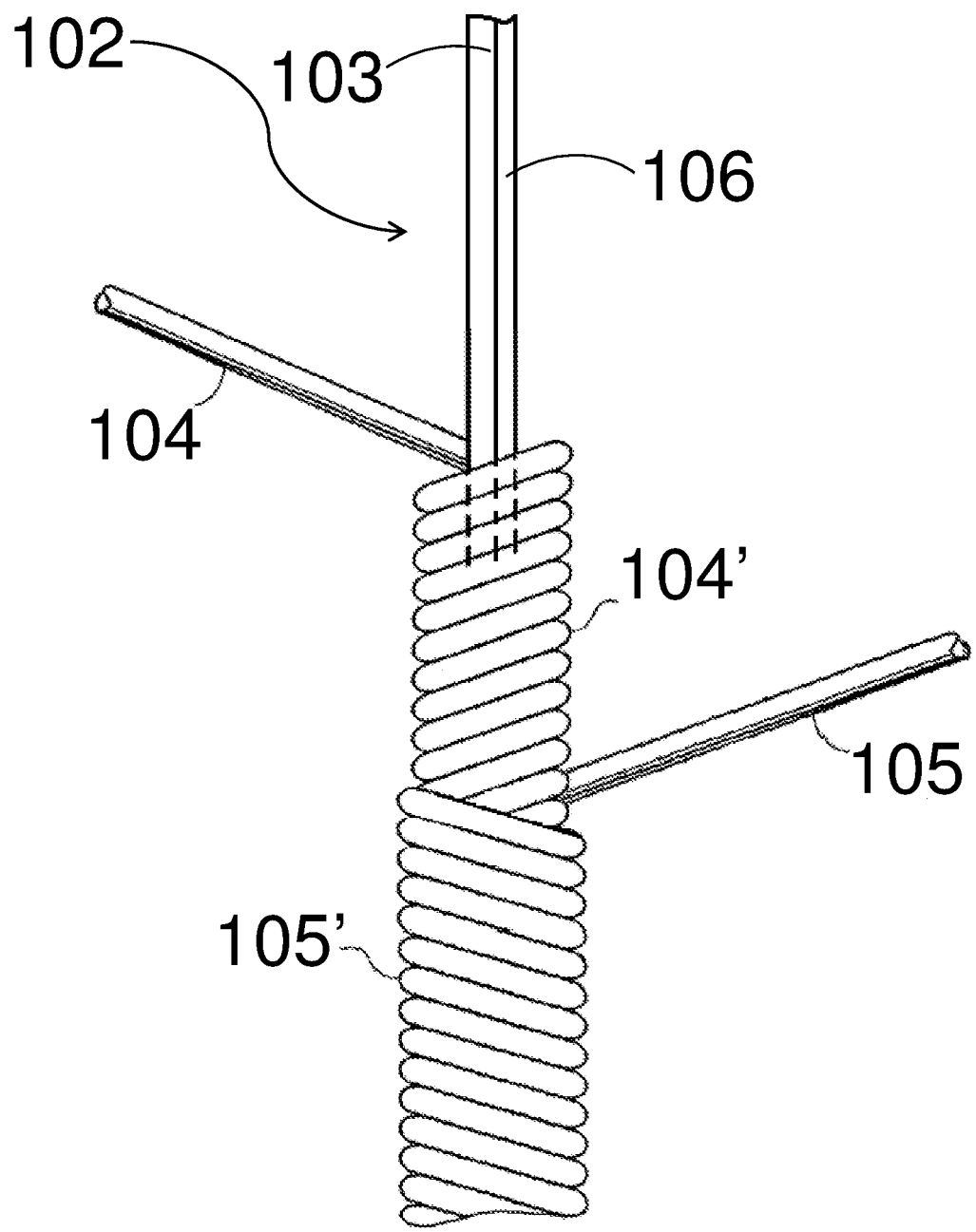
FIG. 2 is a schematic illustration of a heat-shrink and knittable thread according to other various embodiments of the present disclosure.

Referring now to FIG. 2, there is shown a further embodiment of heat-shrink thread 102 being formed. The heat-shrink thread 102 comprises first and second core strands 103, 106 of first and second materials respectively. Optionally, the first material (of the first core strand 103 may be rubber, of any suitable cross-section, such as but not limited to square and circular, as examples. The rubber core 103 may be a natural or synthetic rubber. Optionally, the second material (of the second core strand 106) may be any suitable heat-shrink thread or yarn, such as High Shrinkage Polyester of any suitable cross-section, such as but not limited to, square and circular, as examples. The heat-shrink second core strand 106 is lying beside the first core strand 103. First and second core strands 103, 106 may be of the same, similar or different cross-sectional shape and diameter.

The first and second core strands 103, 106 are together covered by first and second covers 104', 105' of first and second strands 104, 105. The covering yarns 104, 105 may be of heat-shrink yarn, but are not necessarily heat-shrink yarns. Optionally, the first laid helically wound cover 4' is laid in anti-clockwise direction; and the second laid (outer) helically wound cover 5' is laid in a clock-wise direction.

The resultant thread 102 is sufficiently flexible, yet sufficiently strong that it is knittable or suitable for incorporation into a knitted structure, such as a food packaging structure for encapsulating a food-product. To provide an optional degree of elasticity, the first material 103 is an elastic material. In other envisaged arrangements, the first material is a non-elastic material. The second material 106 is formed of a heat-shrink material and being a longitudinal strand within the thread 102, the second core 106 determines, at least to some extent, the degree to which the thread 102 can shrink. The shrink will generally and substantially be in a longitudinal direction through the core axis of the thread 102.

Whereas, the inner cover strand 104 and outer cover strand 105 may also be formed of a heat-shrink yarn or material. In many applications, the inner cover strand 104 and outer cover strand 105 are not heat-shrink materials. Incorporating an inner cover strand 104 and/or outer cover strand 105 of heat-shrink material, may be useful in some applications; however, it is generally preferred, though nevertheless optional, for the inner cover strand 104 and/or outer cover strand 105 to be formed of a non-heat-shrink material, such as viscose yarn (e.g. Rayon®).

The first and second core strands 103, 106 of rubber and High Shrinkage Polyester may be covered by first and second strands 104, 105 in a variety of suitable manners using a variety of suitable methods and techniques. For example, and as shown, the yarn 104 may be helically wound about the first and second core strands 103, 106 of first material. As illustrated in FIG. 2, the yarns 104', 105' are wrapped in such a manner as to completely cover the internally disposed first and second, adjacently laid core strands 103, 106. In this way, notwithstanding the inherent material properties and characteristics of the first cover layer 104' and second outer cover layer 105', for example their abilities to shrink and/or their elasticity, at least the second (longitudinally disposed) core strand 106 is a heat-shrinkable yarn 106 that upon being sufficiently heated will cause the length of the thread 102 to be reduced (i.e. shrunk), and optionally shrunk to between about 15% and 40% of its original length.

In other arrangements of the invention, the first and second cores 103, 106 may be covered, sheathed, or otherwise coated by the cover threads 104', 105' by other methods and processes, for example by: wrapping, helical wrapping, braiding and/or knitting the heat-shrinkable or non-heat-shrinkable yarns about said first and second cores 103, 106 in one or more layers 104', 105'.

As shown in FIG. 2, where two or more layers 104', 105' of yarn 104, 105 are disposed about the one or more core strands 103, 106 of first and second material, the two or more layers 104',105' may be of different materials to one another; may each be formed from the same material; may be formed by the same method of covering; or may be formed by different methods of covering. In this way a thread or yarn, that is knittable, food-grade, suitable for incorporation into a generally or substantially knitted structure, flexible, but strong and heat-shrinkable is formed. Optionally the yarn 102 can shrink to between about 15% and 40% of its original length.

The heat-shrinkable yarn or thread 102 may comprise at least one filament of High Shrinkage Polyester. Other heat-shrinkable yarns may be suitable for use in forming the heat-shrinkable thread 102 described herein.

High Shrinkage Polyester yarn is a polyethylene terephthalate-based yarn that may be characterised by a boiling water shrinkage of at least 40%, that as well as being heat-shrinkable, is also sufficiently strong and flexible that it can be knitted, twisted and optionally knotted. The applicant has designed a thread 102 by incorporating, in a suitable manner, a sufficient amount of heat-shrink (optionally High Shrinkage Polyester) yarn, such that the thread 102 according to the present disclosure may be knittable, incorporated into a knitted structure suitable for encapsulating a food-product and heat-shrinkable. It is further advantageous that a thread 102 of the present invention has material qualities such that it may be suitable for being knitted, and preferably, but not exclusively, suitable for use in warp knitting a tubular net, using existing knitting machines.

Accordingly, a sufficient core (or optionally covering) of heat-shrinkable yarn 103 may be applied in order to produce a thread 102, and net (see FIGS. 3A and 3B), that is also heat-shrinkable. However, it is also highly desirable, if not essential for the thread 102 to be sufficiently flexible that it can be knitted, or incorporated into a knitted packaging structure. Whilst incorporation of a greater amount of heat-shrinkable yarn in the thread 102 (for example by having heat-shrink cover materials 104, 105), may increase the heat-shrinkable character of the resultant thread 102; consideration must also be given to other factors such as the weight, density, thickness, smoothness, pliability, elasticity, tensile strength, and absorbency of the resultant thread 2, 102 as well as the cost of the thread 2, 102 and the production time. For example, if the thread 102 comprises too little heat-shrink material 106; the resultant thread 2, 102 may not provide a sufficient compression of the food-product when sufficiently heated. Accordingly, desirable properties of the thread, such as its elasticity when dry; and the amount of compression it can exert once shrunk can be determined, as desired, upon the specific composition of the thread 2, 102. For production of a sufficiently elastic net; that is not too thick for knitting on existing machinery; and not disproportionately expensive to produce; with adequate stiffness and strength characteristics, yet sufficiently shrinkable, the requirements of the application for the thread need to be considered.

Example 1

In a first non-limiting example, a heat-shrinkable, elastic thread 102 having a core formed from first and second materials and comprising a strand of rubber disposed next to and in contact with a strand of High Shrinkage Polyester, is incorporated into a heat-shrinkable food packaging product comprising a food encapsulating structure formed from a knitted thread. The elastic and heat-shrink core is covered by: a first covering of a clockwise helically wound 300 Denier Polyester yarn; and a second covering of an anti-clockwise helically wound 300 Denier Polyester yarn.

Figure 3A:
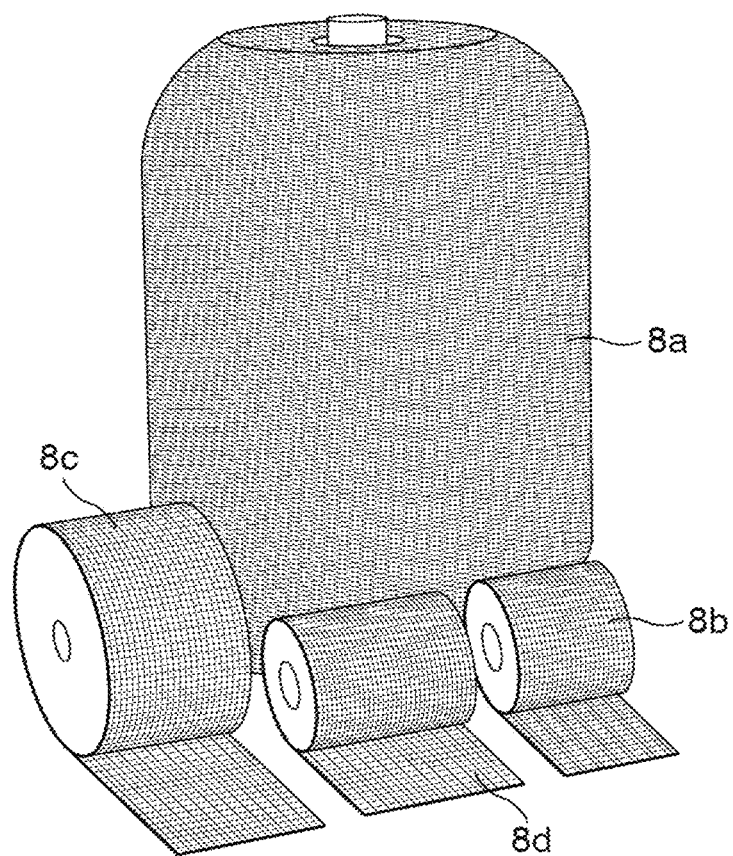
FIG. 3A shows heat-shrink nets of various sizes for packaging food and other products. The heat-shrink nets shown are food-grade and may remain around a food product during cooking.

Such a thread 102 is usable in the production of elastic, tubular, knitted net 8a, 8b, 8c, 8d (see FIG. 3A). The nets 8a, 8b, 8c, 8d are food-grade, elasticated, of various diameter as shown, heat-shrinkable nets suitable for application in butchery, meat packing and in cooking. Of particular advantage is that nets 8a, 8b, 8c, 8d according to the disclosure have been developed so that they can be used in cooking methods that inherently involve sufficient temperatures and heating to cook the product that no additional specific heating steps for shrinking the nets 8a, 8b, 8c, 8d are required. Nets 8a, 8b, 8c, 8d are suitable for use in a wide variety of cooking applications which may or may not involve much or any humidity (liquid and moisture) for example, roasting, grilling, barbequing and pan-frying; as well as pot-roasting, immersion in hot water (boiled, steamed, poached), hot-smoked, scalded, fat-fried, immersed in hot fat, hot-water-showered, and/or braised. During the cooking process, the compression force on the food product is increased, at least to some extent, thus mitigating against the occurrence of voids, bubbles or other gaps being present in the cooked-product and/or retaining the netted or tied pre-cooked shape.

Elasticated (food-grade) netting of the prior art, for example the TruNet® Classic Net, which is a warp knitted synthetic net in tubular form with inlaid spirals of covered natural rubber, whilst suitable for roast, boil, steam and smoking applications as examples, meat contained in the net is not subjected to an increased or substantially greater compressive force during the cooking process. Vertical chains of the TruNet® Classic Net are food grade polyester yarn and horizontal chains are extruded food grade rubber with food grade polyester. If exposed to moist or dry heat, for example during cooking methods that involve heating (about 75° C. or greater), the dimensions of the vertical and horizontal chains do not significantly change and no significant additional compressive force is exerted onto the food product during the cooking process. In contrast, the nets 8*a*, 8*b*, 8*c*, 8*d* taught herein advantageously provide for a greater, more controlled, compression of the food product during a range of heat-processing and/or cooking applications because of the shrinkage pf the nets during the cooking process.

Example 2

Figure 3B:
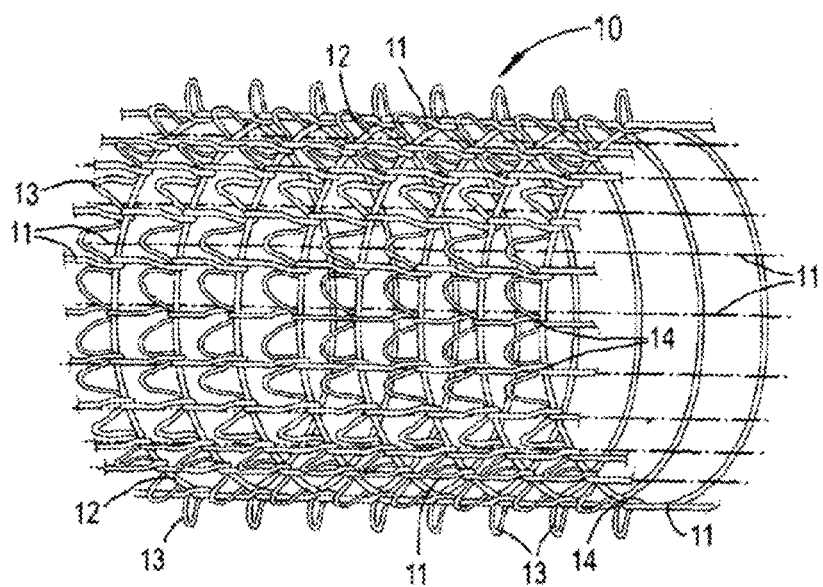
FIG. 3B shows a heat-shrink, tubular, warp knitted net having an inextensible and/or heat-shrink weft.

Turning now to FIG. 3B, there is shown an elastic net 10 with shrinkable weft. In the presently illustrated embodiment, weft threads 13 are non-elastic and are optionally heat-shrinkable, optionally knittable threads 13 suitable for incorporation into a knitted structure 10 for encapsulating a food-product (not shown). The weft threads 13 may comprise a heat-shrinkable yarn 2, 102 comprising, for example High Shrinkage Polyester. The threads 13 in the presently illustrated embodiment comprise a non-elastic first material such as a string. The string may or may not be covered. In some arrangements, the non-elastic strand (string) 13 is covered by one or more helically wound layers of a second material. In some applications, the covering materials may be a heat-shrink material, for example High Shrink Polyester yarn, such as that described in U.S. Pat. No. 4,826,949 to BASF Corporation.

The non-elastic looped weft threads 13, may serve to limit the maximum diameter of the net 10 to a fixed pre-determined diameter. To some extent this may contribute to a degree of compressive force being exerted onto a food-product, such as but not limited to a rolled meat joint, once the food-product has been stuffed into the stretched net 10 (but not yet cooked). The net 10 may be manufactured in a range of sizes.

Referring again to FIG. 3B, the net 10 also comprises vertical chains (warp threads) 11 optionally formed from an elastic and heat-shrinkable thread, yarn or material, (such as threads 2, 102 described above with reference to FIGS. 1 and 2). Additionally, the net 10 comprises, as shown, separated elastic and heat-shrinkable weft threads 12 (such as threads 2, 102 described above with reference to FIGS. 1 and 2). The threads 12 optionally comprise: an elastic rubber core (first material); and a second strand of heat-shrink material such as High Shrinkage Polyester; and a covering formed from helical windings of a non-heat-shrink or heat-shrinkable second material (such as Viscose or High Shrinkage Polyester yarn). In a similar manner as is described in EP2519667, in the production of the net 10 of the present embodiment, the elastic 12 and inextensible 13 weft threads are drawn from separate bobbins and both knitted to the warp threads 11 at the same points 14 along the lengths of the latter.

As an optional alternative weft threads 12 and 13 can be laid into the stitches of the warp threads 11 at the points 14.

In the relaxed condition of the elastic weft threads 12 the net 10 is of relatively small diameter as shown in FIG. 3B and the (non-elastic, heat-shrinkable) weft threads 13 are not straightened and form loops between the warp threads 11. When the net 10 is expanded for example, by a machine, by hand and/or by forcing a meat product into it through a nozzle the elastic weft threads 12 are tensioned and the non-elastic threads 13 straightened until the net 10 reaches a maximum diameter permitted by the non-elastic weft threads 13. The elastic weft threads 12 exert a squeezing force on the meat. When the netted product is exposed to heat during cooking, the inextensible, non-elastic, (optionally high-heat-shrink) weft threads 13 prevent distortion of the product and, along with the heat-shrink elastic weft threads 12 and elastic heat-shrink warp threads 11, shrink to exert an increased compressive force on the meat product. By having heat-shrink warp and heat-shrink weft threads, the compressive force is directed in both vertical and horizontal directions thus ensuring a uniform, cylindrical shape of meat product that is also substantially free-from voids, bubbles and/or gaps.

In other embodiments a tubular knitted net 10 with a degree of elasticity, a restricted or limited diameter weft thread 13 that is inextensible may not be required. Instead, the or each weft threads may be formed solely from heat-shrink material, whether with a core of a first material or not with a core of a first material, but definitely comprising heat-shrinkable yarn (second material). In such an arrangement the net 10 is formed entirely of one or more strands comprising heat-shrink yarn, such as High Shrinkage Polyester yarn.

Nets or other knitted structures suitable for enclosing, encasing, containing or otherwise packaging meat products may be tubular, warp or weft knitted and formed from or incorporating heat-shrink threads, such as threads 2, 102 as described above and may be fully elastic, partially elastic (limited diametral expansion), square-mesh, diagonal mesh, hexagonal mesh, heat-shrinkable food-grade nets.

In other embodiments, net may be inelastic, heat-shrinkable and may be formed from a thread 2, 102 that does not comprise any elastic material. Thread 2, 102 may comprise a first (non-elastic) and heat-shrinkable material and a second (non-elastic) material. Alternatively, the thread may only comprise a heat-shrinkable yarn, such as a High Shrinkage Polyester yarn.

A knitted net according to the disclosure may have a polygonal-shaped mesh and is not limited to such a mesh only being square, or rectangular. Optionally a knitted net according to the disclosure may comprise a generally hexagonal mesh, or diagonal mesh.

It can be appreciated that various changes may be made within the scope of the present invention, for example, in other embodiments of the invention it is envisaged that heat-shrink yarns other than or in addition to High Shrinkage Polyester yarn may be incorporated.

As used herein and in the appended claims the term "heat-shrink" may be taken to mean reduces in size when its temperature is raised above a threshold temperature value (for example 75° C.) and for a sufficient quantity of time (for example 20 to 60 seconds) such that a measurable, noticeable and optionally between about 5% and about 40%, and optionally preferably, 20% reduction in at least one or more dimensions of the knitted net formed therefrom has occurred. The shrink may be permanent.

As used herein and in the appended claims the term "inextensible" should be taken to mean "completely" or "substantially" "inextensible" to allow for the fact that even a thread material such as High Shrinkage Polyester covered string has a limited ability to stretch.

As used herein the terms "thread", "yarn", "strand", and "filament" refer to a length or strand of typically thin material suitable for use in sewing knitting, weaving and the like which may or may not be spun. As used herein the term "fibre" includes fibres of extreme or indefinite length ("filaments") and fibres of short length ("staples"). The terms "yarn", "thread" and "string" as used herein, means a continuous strand of filaments.

As used herein the term "shrinkable food packaging product" covers a wide variety of packaging, processing or preparation products, useful in a very early stage in a product processing and do not refer to outer (secondary or tertiary packaging items such as carriers, cartons, boxes and the like). Rather, such packaging products include packaging products used during and after food processing that may come into direct contact with food. Such packaging products include, as examples and without limitation, warp, weft, elastic, non-elastic, knitted nets; twines; butcher's-type strings; and knotted loops. Such knitted nets may be of a tubular-style, stocking-style and/or inextensible-weft-style. Any of such knitted nets may have square-shaped chains, hexagonal-shaped chains and/or diamond-shaped chains. Such packaging products also include, as examples and without limitation: meat ties; and carcass trussings or bindings.

As used herein the phrase "shrinkable food preparation product comprising a food encapsulating structure formed from a knitted thread, which structure shrinks in the presence of sufficient heat" refers to a product wherein a significant, substantial or sufficient composition of the packaging product is heat-shrink thread or yarn, which as described above may be twisted, knitted, looped, knotted or otherwise formed into a net, string, knotted loop or other knitted structure. In other words, the disclosure relates to a heat-shrink food packaging product that is formed from, formed using, made up of or otherwise substantially comprised of a heat-shrink thread.

As used herein the phrase "a heat-shrinkable food packaging product" may refer to a "food-grade" product that is suitable for being in direct contact with a food product; and as such may be considered as a primary packaging product. However, unlike cartons, plastic cartons and vacuum packets for example, the "shrinkable food packaging products comprising a food encapsulating structure formed from a knitted thread, which structure shrinks in the presence of sufficient heat" referred to herein do not necessarily fully-enclose, fully-wrap or otherwise provide an air-tight housing, container or wrapper for the food item e.g. "meat joint" being packaged. Rather the encapsulating structure may be a knitted net which can shape, form and contain a meat or other food product.

The invention claimed is:

1. A shrinkable food preparation product comprising a knitted food encapsulating structure formed from a heat-shrinkable thread comprising one or more yarns of a heat-shrinkable material, the heat-shrinkable material comprising or formed entirely from a high-shrinkage polyester that shrinks when heated in the temperature range 75° C. to about 225° C., whereby the knitted food encapsulating structure shrinks in the presence of sufficient heat, said high-shrinkage polyester being a polyethylene terephthalate-based yarn having a boiling water shrinkage of at least 40%, the knitted food encapsulating structure thereby being configured such that upon heating the food preparation product, permanent shrinking of at least some of said heat-shrinkable threads imparts a compressive force onto a food product prepared using the food preparation product, the shrinkable food preparation product being in the form of a knitted, seamless, tubular net suitable for encapsulating a meat product, the knitted, seamless, tubular net comprising spaced apart warp threads and spaced apart weft threads, said weft threads being connected to the warp threads, said weft threads and/or said warp threads at least in part comprising said one or more yarns of heat-shrinkable material, the arrangement being such that upon heating a food product encapsulated in the knitted, seamless, tubular net, shrinking of the warp and/or weft threads imparts a compressive force on said food product.

2. The shrinkable food preparation product according to claim 1, wherein only said warp threads comprise a yarn or material that shrinks in the presence of sufficient heat, the arrangement being such that when the net is sufficiently heated, permanent shrinking of said warp threads imparts a compressive force in a vertical direction on a product encapsulated by the tubular net.

3. The shrinkable food preparation product according to claim 1 wherein only said weft threads comprise a yarn or material that shrinks in the presence of sufficient heat, the arrangement being such that when the net is sufficiently heated, permanent shrinking of said weft threads imparts a compressive force in a horizontal direction on a product encapsulated by the tubular net.

4. The shrinkable food preparation product according to claim 1 wherein both said weft threads and said warp threads comprise a yarn or material that shrinks in the presence of sufficient heat, the arrangement being such that when the net is sufficiently heated, permanent shrinking of said warp and weft threads imparts a compressive force in both horizontal and vertical directions on a product encapsulated by the tubular net.

5. The shrinkable food preparation product according to claim 1 wherein, the weft threads comprise spaced apart pairings of first elastic weft threads and second shrinkable weft threads; all of said first and second weft threads being connected to each of the warp threads, and wherein the first elastic and second shrinkable weft threads have no connection to one another between the warp threads, the arrangement being such that before heating the weft threads and warp threads, the net is stretchable, and such that upon heating the net, permanent shrinking of the second shrinkable weft threads imparts a compressive force on a product encapsulated by the tubular net.

6. The shrinkable food preparation product according to claim 5 wherein the first elastic weft threads and the second shrinkable weft threads of each pair are connected at the same points along their lengths to the warp threads, these being the only connections between the elastic and shrinkable weft threads.

7. The shrinkable food preparation product according to claim 1 wherein the weft threads comprise spaced apart pairings of first elastic weft threads and second shrinkable weft threads, and wherein the first elastic weft threads and the second shrinkable weft threads are knitted to the warp threads.

8. The shrinkable food preparation product according to claim 1 wherein the weft threads comprise spaced apart pairings of first elastic weft threads and second shrinkable weft threads, and wherein the first elastic weft threads are of bare rubber, or wherein each of the first elastic weft threads has a rubber or synthetic rubber core covered by helically wound yarn.

9. The shrinkable food preparation product according to claim 1 wherein the weft threads comprise spaced apart pairings of first elastic weft threads and second shrinkable weft threads, and wherein the second shrinkable weft threads are a bare yarn.

10. The shrinkable food preparation product according to claim 1 wherein the weft threads comprise spaced apart pairings of first elastic weft threads and second shrinkable weft threads, and wherein the second shrinkable weft threads have a core formed from a yarn or material that shrinks in the presence of sufficient heat, covered by helically wound yarn.

11. The shrinkable food preparation product according to claim 5 wherein the warp threads also at least in part comprise a yarn or material that shrinks in the presence of sufficient heat.

12. The shrinkable food preparation product according to claim 11 wherein the warp threads are a bare yarn.

13. The shrinkable food preparation product according to claim 11 wherein the warp threads are formed from a yarn or material that shrinks in the presence of sufficient heat covered by a helically wound yarn.

14. The shrinkable food preparation product according to claim 11 wherein the shrinkable weft threads and shrinkable warp threads are both formed from high-shrinkage polyester.

15. The shrinkable food preparation product for encapsulating a meat product, according to claim 1, wherein said weft threads and/or said warp threads comprise a yarn or material that shrinks in the presence of sufficient heat that is wrapped, wound, helically wound, braided and/or knitted.

16. The shrinkable food preparation product for encapsulating meat product according to claim 1 wherein the knitted, tubular net has square-shaped chains, hexagonal-shaped chains and/or diamond-shaped chains.

17. The shrinkable food preparation product for encapsulating a meat product, according to claim 1, wherein the net is warp knitted and elasticated; or wherein the net is warp knitted and not elasticated; or wherein the net is weft knitted and elasticated; or wherein the net is weft knitted and not elasticated.

18. The shrinkable food preparation product for encapsulating a meat product, according to claim 1 wherein the net is closed at one end in the form of a stocking or wherein the net is open at both ends.

\* \* \* \* \*